United States Patent
Hanada et al.

(12)

(10) Patent No.: US 6,352,785 B1
(45) Date of Patent: Mar. 5, 2002

(54) SHRINKABLE FILM

(75) Inventors: Satoshi Hanada; Ryuma Kuroda, both of Ibaraki; Taiichi Sakaya, Takatsuki, all of (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 0 days.

(21) Appl. No.: 09/417,115

(22) Filed: Oct. 13, 1999

(30) Foreign Application Priority Data

Oct. 15, 1998 (JP) .......................................... 10-293741

(51) Int. Cl.$^7$ .............................................. B32B 27/30
(52) U.S. Cl. ................ 428/522; 264/209.3; 264/209.4; 264/209.5; 428/520; 428/910
(58) Field of Search ............................... 428/35.4, 36.6, 428/36.7, 515, 516, 520, 522, 910; 264/209.3, 209.4, 209.5

(56) References Cited

U.S. PATENT DOCUMENTS

| | | | |
|---|---|---|---|
| 4,746,562 A | 5/1988 | Fant | 428/213 |
| 4,753,700 A | 6/1988 | Fant | 264/514 |
| 4,755,419 A | 7/1988 | Shah | 428/220 |
| 5,004,647 A | 4/1991 | Shah | 428/349 |

OTHER PUBLICATIONS

Derwent Abstract of World Patent Application No. 98/50466, Nov. 12, 1998.
Derwent Abstract of Japanese Patent Application No. 62–5792, Feb. 6, 1987.
Derwent Abstract of Japanese Patent Application No. 4–9673, Feb. 20, 1992.

*Primary Examiner*—D. S. Nakarani
(74) *Attorney, Agent, or Firm*—Sughrue Mion, PLLC

(57) ABSTRACT

The present invention provides a shrinkable film characterized by being a laminate film having at least one layer formed of a gas barrier resin composition satisfying the following expressions (1) and (2) and by having an average shrinking rate in its longitudinal and transverse directions after immersion in a 120° C. oil bath for ten seconds of 45% or more:

$$\ln(OTR/22.5)+0.0698(T_{im}-157)<-0.06 \quad (1)$$

$$T_2-T_1 \leq 20 \quad (2)$$

(where in the expression (1), OTR and $T_{im}$ are, respectively, an oxygen transmission rate (cc/m$^2 \cdot$day$\cdot$atm) of a 1-$\mu$m thick portion of a film formed of the gas barrier resin composition at 23° C. and a relative humidity of 0% and a melting point of the gas barrier resin composition, and in the expression (2), $T_1$ is a haze (%) of a 30-$\mu$m thick film of the gas barrier resin composition left at 23° C. and a relative humidity of 48% for 48 hours and $T_2$ is a haze (%) of a 30-$\mu$m thick film of the gas barrier resin composition left at 40° C. and a relative humidity of 90% for 24 hours.)

The present invention relates to shrinkable films considering the environment which are suitably used for wrapping foods or the like and have good oxygen barrier property, processability, transparency and strechability, especially.

23 Claims, No Drawings

SHRINKABLE FILM

BACKGROUND OF THE INVENTION

1. Field to the Invention

The present invention relates to shrinkable films considering the environment which are suitably used for wrapping foods or the like and have good oxygen barrier property, processability, transparency and strechability, especially.

2. Description of the Related Art

Shrink packaging, that uses stretched films (heat shrinkable films) which are widely adopted in industrial packaging such as food packaging, pharmaceutical drug packaging and industrial parts packaging, is performed by, for example, charging an object into a bag formed of a stretched film, removing air in the bag if demanded, sealing the opening of the bag, and heating the stretched film to shrink it.

Packaging and delivering some types of foods such as cheese, pork, smoked or processed meat and, especially, fresh blood-red meat require to keep qualities of these products at good conditions for a long time until the products are gotten by consumers. Especially, in the case of the fresh blood-red meat, since oxygen accelerates degradation (decomposition) of the meat caused by microorganisms, it is important to securely protect the meat from oxygen for a long time.

In order to prevent oxygen to pass, wrapping having a multilayer structure comprising a resin sheet or film with good oxygen barrier property are often employed. An oxygen barrier resin material is required to have process ability which means good ease to handle it during forming, transparency at a time of forming, performance of having good strechability and shrinkability after a stretched film is formed, or the like as well as oxygen barrier property.

Oxygen barrier resin materials employed for conventional shrinkable films have some problems. Namely, for example, they have an insufficient oxygen barrier property. Alternatively, even if they have a good oxygen barrier property, they require to be processed at a high temperature because of their high melting points, and are easy to cause heat degradation. Cost for maintaining equipment for processing at high temperature, therefore, becomes expensive.

Shrinkable films used as wrappers are required that the wrapped objects are easy to be seen. When objects wrapped with such shrinkable films are sold as commercial products, consumers can buy them after examining the actual products and can directly confirm degradation or defects of the products. In addition, sellers can show appearance of the objects wrapped to buyers. Therefore, transparency of wrapping is important.

On the other hand, films used for shrink packaging is demanded to have a property to shrink well by heating. Additionally, lowering a temperature at which a film can be shrunk by heating is demanded from the viewpoint of shortening a wrapping cycle. In order that a stretched film is shrunk by heating, the stretched film must be heated at a temperature higher than the stretching temperature in its manufacture. It is, therefore, thought that a heat shrinking temperature of a stretched film depends on a stretching temperature in the manufacture of the stretched film.

A shrinkable film is usually manufactured by stretching a film at a temperature higher than room temperature to orient molecules followed by cooling it to stop motion of the molecules, and when wrapping is carried out, it is shrunk by reheating to relieve the orientation of the molecules. Stretching and shrinking behavior of films varies depending on the types of the polymers used. However, what is required of wrapping films, especially those with the oxygen barrier property, is to have characteristics that the films can be stretched at a relatively moderate temperature and subsequently can be shrunk at a moderate temperature.

Additionally, the more a stretching degree of a film becomes, the more its shrinking rate becomes. Hence the more a stretching rate of a specific film becomes, the more its shrinkability in the whole temperature range, especially at a low temperature, becomes.

Especially in order to make wrapping foods and containers more efficient, the speed of a wrapping line must be increased. In addition, a shrinkable film capable of exhibiting a high shrinking rate at a lower temperature is demanded in order to prevent wrapped products to degrade due to a high temperature.

A shrinkable film is often required to have, for example, heat sealability, gas barrier property and tearing strength as well as the aforementioned characteristics. When one intends to satisfy these characteristics required, there is a problem that materials which can be used are restricted and a heat shrinking rate is limited. On this account, development of shrinkable films using specified materials and layer compositions which can shrink well at a low temperature might be needed.

By the way, since a saponified ethylene/vinyl ester copolymer is superior to other resins in transparency and a gas barrier property, especially the oxygen barrier property, films formed thereof have been widely used in wrapping applications. Since the saponified ethylene/vinyl ester copolymer (especially, a saponified ethylene/vinyl acetate copolymer) has high rigidity and poor stretchability (especially, stretchability at a low temperature,) a temperature at which the saponified ethylene/vinyl ester copolymer can be stretched is high. When the saponified ethylene/vinyl ester copolymer is stretched at a low temperature, there will cause cracking, uneven stretching, blushing, etc., and stretched films with insufficient performance are adversely obtained. For this reason, improvement in stretchability of the saponified ethylene/vinyl ester copolymer is demanded.

For example, Japanese Laid-Open Patent Publication Nos. 53(1978)-88067 and 59(1984)-20345 disclose improvement in stretchability of a saponified ethylene-vinyl ester copolymer by adding a variety of plasticizers. The saponified ethylene-vinyl ester copolymers obtained by such conventional methods, however, do not have enough stretchability.

Although nylon, polyvinylidene chloride, polyvinyl alcohol, liquid crystal polymers and the like have been hitherto employed as gas barrier materials, there have been known that nylon and polyvinylidene chloride are inferior to the saponified ethylene/vinyl ester copolymer in the gas barrier property, and on the other hand, polyvinyl alcohol and liquid crystal polymers are inferior to the saponified ethylene/vinyl ester copolymer in stretchability. These gas barrier materials do not have a satisfactory balance between the gas barrier property and the stretchability.

The present inventors have made an intensive investigation to develop a shrinkable film with good oxygen barrier property, processability, transparency and stretchability, and as a result, have accomplished the present invention.

SUMMARY OF THE INVENTION

The present invention provides;
1. a shrinkable film characterized by being a laminate film having at least one layer formed of a gas barrier resin composition satisfying the following expressions (1) and (2) and by having an average shrinking rate in its longitudinal and transverse directions after immersion in a 120° C. oil bath for ten seconds of 45% or more:

$$\ln(OTR/22.5)+0.0698(T_{im}-157)<-0.06 \quad (1)$$

$$T_2-T_1 \leq 20 \quad (2)$$

(where in the expression (1), OTR and $T_{im}$ are, respectively, an oxygen transmission rate (cc/m$^2$·day·atm) of a 1-$\mu$m thick portion of a film formed of the gas barrier resin composition at 23° C. and a relative humidity of 0% and a melting point of the gas barrier resin composition, and in the expression (2), $T_1$ is a haze (%) of a 30-$\mu$m thick film of the gas barrier resin composition left at 23° C. and a relative humidity of 48% for 48 hours and $T_2$ is a haze (%) of a 30-$\mu$m thick film of the gas barrier resin composition left at 40° C. and a relative humidity of 90% for 24 hours.)

2. The shrinkable film according to the above 1 wherein its average heat shrinking rate in the longitudinal and transverse directions after immersion in an 80° C. oil bath for 10 seconds is 20% or more.
3. The film according to the above 1 wherein its oxygen transmission rate at a dry condition is 30 cc/m$^2$·day·atm or less.
4. The film according to the above 1 wherein a gas barrier resin composition, a 30-$\mu$m film formed thereof having a haze value measured after immersion in dimethyl phthalate of 15% or less, is used.
5. The film according to the above 1 wherein the gas barrier resin composition is a saponified ethylene-vinyl ester copolymer-containing resin composition.
6. The film according to the above 5 wherein the saponified ethylene-vinyl ester copolymer-containing resin composition contains 99–50 wt % of a saponified ethylene-vinyl ester copolymer.
7. The film according to the above 1 wherein the film has at least one layer containing an ionomer resin besides the layer formed of the gas barrier resin composition.
8. The film according to the above 7 wherein the ionomer resin is a partially ionized ethylene-(meth)acrylic acid copolymer.
9. The film according to the above 5 wherein the saponified ethylene-vinyl ester copolymer-containing resin composition is a resin composition comprising the saponified ethylene-vinyl ester copolymer and one or two or more species of alcohol compounds represented by the general formula (1):ps $$\begin{array}{c} R_4 \\ | \\ R_3-C-OH \\ | \\ R_1-C-R_2 \\ | \\ R_5-C-OH \\ | \\ R_6 \end{array} \quad (1)$$

(where $R_1$ to $R_6$ are same or different and are a hydrogen atom or atomic groups formed of at least two atoms selected from carbon, hydrogen, oxygen, nitrogen, sulfur and phosphorous and the total atomic weight of the atoms forming $R_2$ is equal to or more than the total atomic weight of the atoms forming $R_1$,) and wherein the alcohol compound has a solubility parameter (SP) calculated from the FEDORS' formula of 12 or more and an SP X MW$^{1/2}$ value of 225 or more where MW indicates the molecular weight of the alcohol compound, (with the proviso that when two or more species of the alcohol compounds are contained, SP and MW are an average solubility parameter and a weight average molecular weight, respectively.)

10. The film according to the above 9 wherein the alcohol compound represented by the general formula (1) has an SP of 13 or more.
11. The film according to the above 9 wherein the alcohol compound represented by the general formula (1) has an SP×MW$^{1/2}$ value of 235 or more and 20000 or less.
12. The film according to the above 9 wherein the substituent $R_1$ of the alcohol compound represented by the general formula (1) is an hydrogen atom, a hydroxyalkyl group, an alkyl group, an amino group or an atomic group having an amino group.
13. The film according to the above 9 wherein the substituent $R_1$ of the alcohol compound represented by the general formula (1) is a hydroxymethyl group, a methyl group or an ethyl group.
14. The film according to the above 9 wherein the substituent $R_2$ of the alcohol compound represented by the general formula (1) is an atomic group having an OH group and the total atomic weight of the atoms forming $R_2$ is 31 or more.
15. The film according to the above 9 wherein the substituent $R_2$ of the alcohol compound represented by the general formula (1) is an atomic group having an OH group and the total atomic weight of the atoms forming $R_2$ is 31 or more and said $R_2$ has an ether bond.
16. The film according to the above 9 wherein the substituents $R_3$ to $R_6$ of the alcohol compound represented by the general formula (1) are same or different and are a hydrogen atom or an alkyl group having 1 to 6 carbon atoms.
17. The film according to the above 9 wherein the substituents $R_3$ to $R_6$ of the alcohol compound represented by the general formula (1) are same or different and are a methyl group or an ethyl group.
18. The film according to the above 9 wherein the saponified ethylene-vinyl ester copolymer-containing resin composition is a resin composition comprising the saponified ethylene-vinyl ester copolymer and two or more sorts of the alcohol compounds represented by the general formula (1) and wherein at least one sort of the alcohol compounds has a solubility parameter (sp) calculated from the FEDORS' formula of 16 or more and an sp×mw$_i^{1/2}$ value of 280 or more where mw$_i$ indicates a molecular weight of the alcohol compound.
19. The film according to the above 9 wherein the alcohol compound represented by the general formula (1) is poly-trimethylolpropane or di-pentaerythritol.
20. The film according to the above 9 wherein the alcohol compound represented by the general formula (1) is a dimer, a trimer, a tetramer or a pentamer of trimethylolpropane.
21. The film according to the above 18 wherein at least one sort of the alcohol compounds represented by the general formula (1) is di-pentaerythritol.
22. A method for producing a shrinkable film, which is characterized by comprising a step of stretching in at least uniaxial direction a laminate film having at least one layer formed of a gas barrier resin composition satisfying the following expressions (1) and (2) until its average shrinking rate in its longitudinal and transverse directions after immersion in a 120° C. oil bath for ten seconds becomes 45% or more:

$$\ln(OTR/22.5)+0.0698(T_{im}-157)<-0.06 \quad (1)$$

$$T_2-T_1 \leq 20 \quad (2)$$

(where in the expression (1), OTR and $T_{im}$ are, respectively, an oxygen transmission rate (cc/m²·day·atm) of a 1-μm thick portion of a film formed of the gas barrier resin composition at 23° C. and a relative humidity of 0% and a melting point of the gas barrier resin composition, and in the expression (2), $T_1$ is a haze (%) of a 30-μm thick film of the gas barrier resin composition left at 23° C. and a relative humidity of 48% for 48 hours and $T_2$ is a haze (%) of a 30-μm thick film of the gas barrier resin composition left at 40° C. and a relative humidity of 90% for 24 hours.)

23. The method according to the above 22 wherein stretching in at least uniaxial direction is carried out by a tubular stretching method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

The shrinkable film of the present invention is a laminate film having at least one layer formed of the gas barrier resin composition satisfying the aforementioned expressions (1) and (2).

If the gas barrier resin composition used does not satisfy the expression (1), the shrinkable film obtained has too high an oxygen transmission rate, in other words an insufficient oxygen barrier property, or the gas barrier resin composition has such a high melting point that it is easy to cause heat degradation during processing. Alternatively, the gas barrier resin composition has poor stretchability at a low temperature or requires a high stretching temperature to be sufficiently stretched.

For example, even if the expression (1) is satisfied, the shrinkable film obtained becomes poor in transparency and can not be well improved in stretchability or is deteriorated in the oxygen barrier property unless the expression (2) is also satisfied. In order to reconcile the oxygen barrier property and stretchability, the value of $\ln(OTR/22.5)+0.0698(T_{im}-157)$ is more preferably less than −0.1, and especially preferably less than −0.4.

In the expression (1), OTR indicates an oxygen transmission rate (cc/m²·day·atm) of a 1-μm thick portion of a film formed of a gas barrier resin composition (a) used in the present invention measured at 23° C. and at a relative humidity of 0% (RH). From the viewpoint of an oxygen barrier property, OTR is preferably less than 40, more preferably 22.5 or less, and still more preferably 11 or less.

$T_{im}$ is a melting point of the gas barrier resin composition (a) used in the present invention, and concretely indicates a value determined by using a differential scanning calorimeter according to JIS K7121 after pretreating a sample which has been left at 23° C. and at a relative humidity of 50% for more than 24 hours in the measuring apparatus. The temperature which corresponds to the intersection of the straight line formed by extending the base line on the lower temperature side of the melting peak in the DSC curve to the higher temperature side and the tangent line having the largest incline drawn to the curve on the lower temperature side of the melting peak is defined as the melting point ($T_{im}$).

In the expression (2), $T_1$ is a haze of a 30-μm thick film formed of the gas barrier resin composition (a) used in the present invention measured after being left at 23° C. and at a relative humidity of 48% for 48 hours. $T_2$ is a haze of a 30-μm thick film formed of the gas barrier resin composition (a) used in the present invention measured after being left at 40° C. and at a relative humidity of 90% for 24 hours.

The shrinkable film of the present invention further has an average shrinking rate in its longitudinal and transverse directions measured after immersion in a 120° C. oil bath for ten seconds of 45% or more. If the average shrinking rate is less than 45%, one must make a heat treatment at a higher temperature in order to make beautiful the appearance of a product after heat-shrink wrapping. This results in elongation of a cooling step after wrapping and difficulty in shortening the wrapping step, and in addition, makes a wrapped product easy to be degraded by the heat of heat treatment. The average shrinking rate in the longitudinal and transverse directions after immersion in a 120° C. oil bath for ten seconds is preferably 50% or more, more preferably 60% or more. Additionally, in order to obtain more beautiful appearance, an average shrinking rate in the longitudinal and transverse directions after immersion in an 80° C. oil bath for ten seconds is preferably 20% or more.

Measurement of the shrinking rate may be carried out by the method provided in ASTM D2732. Using a piece obtained by cutting a film into a size of 100 mm×100 mm as a test specimen, one calculates a value of ((L1−L2)/L1)× 100, which is defined as the shrinking rate, from a length (L1) of a side of the specimen before shrinking and a length (L2) of that side after pulling up the specimen after immersion in an oil bath set at a predetermined temperature for 10 seconds. The average shrinking rate in the longitudinal and transverse directions is determined by calculating the shrinking rates of the test specimen in its longitudinal direction and its transverse direction respectively, followed by averaging the rates.

When the shrinkable film of the present invention is used as wrapping material for the products such as foods, pharmaceutical drugs and industrial parts, much transparency may be required. When the shrinkable film of the present invention is used for such applications, a gas barrier resin composition, a 30-μm film formed thereof having a haze value ($T_3$) measured after immersion in dimethyl phthalate of 15% or less, is preferably used. The $T_3$ is more preferably 10% or less, and still more preferably 5% or less.

Examples of the resin used for the gas barrier resin composition include polyvinylalcohol and its analog, saponified ethylene-vinyl alcohol copolymer, polyethylene (low density, high density), ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer, and an ionomer resin;

polyester resins such as polyethylene terephthalate, polybutylene terephthalate, polyethylene naphthalate and polyhydroxybenzoic acid; polyamide resins such as nylon-6, nylon-6,6, metaxylenediamine-adipic acid condensation polymerization product, polymethyl methacrylimide, diethylenetriamine-adipic acid copolymer and a salt thereof; aramid resins; acrylic resins such as polymethyl methacrylate, polyacrylic acid, poly(sodium acrylate), poly-2-hydroxyethyl acrylate, poly-2-hydroxyethyl methacrylate, ethylene-acrylic acid copolymer and a salt thereof;

styrene- and/or acrylonitrile-based resins such as polystyrene, styrene-acrylonitrile copolymer, styrene-acrylonitrile-butadiene copolymer and polyacrylonitrile; halogen-containing resins such as polyvinyl chloride, polyvinylidene chloride, polyvinylidene fluoride and polytetrafluoroethylene; engineering plastic resins such as polycarbonate resin, polysulfone resin, polyethersulfone resin, polyether etherketone resin, polyphenyleneoxide resin and polymethyleneoxide resin;

or modified resins obtained from the aforementioned resins by graft modification, crosslinking, or polymer-chain-terminal modification; or mixtures of two or more sorts among the aformentioned resins and/or the modified resin obtained therefrom.

Among the above-exemplified resins, the saponified ethylene-vinyl ester copolymer, modified ethylene-vinyl ester copolymers such as the graft modified, crosslinked or polymer-chain-terminal-modified saponified ethylene-vinyl ester copolymer and the like are preferred from the viewpoint of the gas barrier property. Vinyl acetate is a preferable vinyl ester.

As for the saponified ethylene-vinyl ester copolymer, an ethylene unit content in the copolymer is preferably 20–60 mol %, more preferably 20–45 mol %, and especially preferably 25–40 mol % from the viewpoint of moisture resistance. A saponification degree of the vinyl ester moiety is usually 90 mol % or more, preferably 95 mol % or more, and more preferably 98 mol % or more. Ethylene unit contents of more than 60 mol % are not preferred because of significant degradation in gas barrier property. Saponification degrees of less than 90 mol % are also not preferred because of significant degradation in gas barrier property.

When using the saponified ethylene-vinyl ester copolymer, the content of the saponified ethylene-vinyl ester copolymer in the gas barrier resin composition is preferably 99–50 wt % from the viewpoint of the oxygen barrier property, processability and stretchability of a shrinkable film to be obtained.

When the saponified ethylene-vinyl ester copolymer is used, the gas barrier resin composition is preferably a resin composition comprising the saponified ethylene-vinyl ester copolymer and one or two or more species of alcohol compounds represented by the general formula (1):

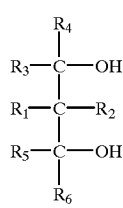

(1)

(wherein $R_1$ to $R_6$ are same or different and are a hydrogen atom or atomic groups formed of at least two atoms selected from carbon, hydrogen, oxygen, nitrogen, sulfur and phosphorous and the total atomic weight of the atoms forming $R_2$ is equal to or more than the total atomic weight of the atoms forming $R_1$) and the alcohol compound preferably has a solubility parameter calculated from the FEDORS' formula (hereinafter sometimes referred to as SP) of 12 or more and an SP×MW$^{1/2}$ value of 225 or more where MW indicates a molecular weight of the alcohol compound.

The alcohol compounds may be used singly or in combinations of two or more of them. In the case of using two or more species of the alcohol compounds, the SP means their average solubility parameter defined by the following expression (3):

$$SP = (\Sigma \alpha_i \Delta E v_i / \Sigma \alpha_i V_i)^{1/2} \qquad (3)$$

(where $\Delta Ev_i$, $V_i$ and $\alpha_i$, respectively, represent an energy of vaporization of each alcohol compound at a given temperature, a molar volume of each alcohol compound and a mol fraction of each alcohol compound in the whole alcohol compounds used,) and the MW indicates a weight average molecular weight defined by the following expression (4):

$$MW = \Sigma \phi_i m w_i \qquad (4)$$

(where $\phi_i$ and $mw_i$, respectively, represent a weight fraction of each alcohol compound in the whole alcohol compounds used and a molecular weight of each alcohol compound.).

The SP calculated from the FEDORS' formula is represented by the following expression (5) as described in POLYMER ENGINEERING AND SCIENCE Vol. 14, No. 2, pages 147–154 (1974):

$$SP = (\Delta Ev/V)^{1/2} \qquad (5)$$

(where $\Delta Ev$ represents an energy of vaporization at a given temperature and V represents a molar volume.)

$\Delta Ev$ and V, respectively, are represented by the expressions of $\Delta Ev = \Sigma \Delta e_i$ and $V = \Sigma \Delta v_i$, and $e_i$ and $v_i$, respectively, are values given in Table 5 in POLYMER ENGINEERING AND SCIENCE Vol. 14, No. 2, pages 147–154 (1974)

When the above-mentioned alcohol compounds are used, the SP is preferably 13 or more from the viewpoint of compatibility, and the upper limit thereof is usually 20. Additionally, the value of SP×MW$^{1/2}$ is preferably 235 or more in order to prevent the alcohol compounds to bleed, and the upper limit thereof is usually 20000.

In the alcohol compounds represented by the general formula (1), $R_1$ to $R_6$ are same or different and are a hydrogen atom or atomic groups formed of at least two sorts of atoms selected from carbon, hydrogen, oxygen, nitrogen, sulfur and phosphorous. The total atomic weight of the atoms forming $R_2$ is equal to or more than the total atomic weight of the atoms forming $R_1$. These atoms and atomic groups may be chosen so that the SP and the MW satisfy the aforementioned conditions. Examples of $R_1$ to $R_6$ include the following atoms and atomic groups.

There can be exemplified a hydrogen atom; atomic groups such as alkyl groups, cycloalkyl groups, aromatic hydrocarbon groups and heterocyclic groups; functional groups such as a hydroxyl group, a carbonyl group, a carboxyl group, alkoxy groups, an epoxy group, an amino group, a nitro group, a nitroso group, a sulfinyl group, a sulfonyl group, a phosphino group and a phosphinoyl group; and the above-mentioned atomic groups having at least one functional group selected from the above-listed ones.

Among these exemplified atom and atomic groups, a hydrogen atom, hydroxyalkyl groups, alkyl groups, an amino group or the atomic groups having the amino group are preferred as $R_1$, and a hydroxymethyl group, a methyl group, an ethyl group and an amino group are preferred. A preferred example of $R_2$ is an atomic group which has an OH group and whose total atomic weight of all the atoms forming $R_2$ is 31 or more. An atomic group which further has an ether bond is more preferable. $R_3$ to $R_6$ are preferably same or different and are a hydrogen atom or alkyl groups having 1 to 6 carbon atoms. Preferred alkyl groups are a methyl group and an ethyl group.

Specific examples of the alcohol compounds include poly-pentaerythritols such as di-pentaerythritol and tri-pentaerythritol; poly-trimethylolmethanes such as di-trimethylolmethane and tri-trimethylolmethane; poly-trimethylolethanes such as di-trimethylolethane and tri-trimethylolethane; poly-trimethylolpropanes such as di-trimethylolpropane and tri-trimethylolpropane; poly-2-amino-2-hydroxymethyl-1,3-propanediols such as di-2-amino-2-hydroxymethyl-1,3-propanediol and tri-2-amino-2-hydroxymethyl-1,3-propanediol. Esterified products having a 1,3-diol skeleton, which are formed from the above-exemplified compounds and carboxylic acids such as monocarboxylic acids, dicarboxylic acids, tricarboxylic acids or the like can also be exemplified. Examples of the monocarboxylic acid include aliphatic monocarboxylic acid such as acetic acid, propionic acid, butyric acid, valeric acid, caproic acid, enanthic acid, caprylic acid, capric acid, pelargonic acid, undecanoic acid, lauric acid, tridecanoic acid, myristic acid, myritrainic acid, palmitic acid, stearic acid, oleic acid, linoleic acid, arachic acid, and behenic acid, alicyclic monocarboxylic acid such as cyclohexanecarboxylic acid and methylcyclohexanecarboxylic acid; and aromatic monocarboxylic acids such as benzoic acid, toluic acid, ethylbenzoic acid and phenylacetic acid.

Examples of the dicarboxylic acid include aliphatic dicarboxylic acids such as malonic acid, succinic acid, glutaric acid, adipic acid, pimelic acid, suberic acid, azelaic acid, sebacic acid, dodecanedionic acid, tetradecanedionic acid, hexadecanedionic acid, octadecanedionic acid, octadecenedionic acid, eicosanedionic acid, eicosenedionic acid, docosanedionic acid and 2,2,4-trimethyladipic acid; alicyclic dicarboxylic acids such as 1,4-cyclohexanedicarboxylic acid; and aromatic dicarboxylic acids such as terephthalic acid, isophthalic acid, phthalic acid and xylenedicarboxylic acid.

Among the above-exemplified compounds, poly-trimethylolpropanes and di-pentaerythritol are preferred, and more preferred are a dimer, a trimer, a tetramer and a pentamer of trimethylolpropane.

In the present invention, when the saponified ethylene-vinyl ester copolymer uses the resin composition comprising the saponified ethylene-vinyl ester copolymer and two or more sorts of the alcohol compounds represented by the general formula (1), at least one sort of the alcohol compounds preferably has a solubility parameter (sp) calculated from the FEDORS' formula of 16 or more and an sp×$mw_i^{1/2}$ value of 280 or more where $mw_i$ indicates a molecular weight of the alcohol compound is from the viewpoint of improvement in stretchability. Such a favorable alcohol compound may be hereinafter referred to as an alcohol compound (a). When the resin composition contains the alcohol compound (a), the content thereof is preferably 20% by weight or more from the viewpoint of improvement in stretchability and 70% by weight or less in order to prevent the alcohol compound to bleed.

The alcohol compound (a) may be, for example, polypentaerythritols, and especially, dipentaerythritol is preferred.

Furthermore, one may react the above-mentioned alcohol compound and a saponified ethylene-vinyl ester copolymer to form a modified ethylene-vinyl ester copolymer, or may make a copolymer using the alcohol compound as a copolymerizing monomer.

In the case where the resin used for the gas barrier resin composition is a modified resin, a manufacturing method thereof may be, for example, modifying methods by grafting such as methods used for conventional graft modification, e.g., a method in which a polymerization initiating site is formed in a trunk polymer and monomers are polymerized, a method using an interpolymer reaction or the like. The reactions may be either a homogeneous reaction (for example, a solution reaction) or a heterogeneous reaction (for example, a solid-liquid reaction). Crosslinking methods may be conventional crosslinking methods such as a method using a crosslinking agent, a method using heat or the like. An example of a method for modifying a terminal of a polymer chain is a conventional terminal-modifying method in which a functional atomic group is introduced to terminate polymerization. Such modification may be carried out in a molding machine such as a film forming machine.

As a method for obtaining the gas barrier resin composition, there can be exemplified manufacturing methods such as a melt kneading extrusion method using a conventional single- or twin-screw extruder used for kneading, and the like. When the gas barrier resin composition is a composition containing a viscous fluid, the fluid may be dissolved in a water or an organic solvent to be used. In such a case, there may be exemplified a method in which the solution is charged into a cylinder of the above-mentioned extruder with a pump for supplying liquids under melt extrusion of a resin and kneaded with the resin while heating, a method in which resin pellets and the solution are blended in a mixer such as a Henschel Mixer and the blend is thereafter charged to the above-mentioned extruder and kneaded, etc. Furthermore, it is possible that a high concentration master batch of ingredients other than resin is prepared previously, and the master batch is thereafter pellet blended with resin and directly charged to a molding machine such as a film forming machine. In the case where the gas barrier resin composition is powder, there can be exemplified a method in which the powder is directly supplied into an extruder using a conventional dry blending method, a compactor, etc.

The shrinkable film of the present invention is a laminate film having at least one layer formed of the above-mentioned gas barrier resin composition. Other layer than the layer of the gas barrier resin composition may be other resin layers such as a substrate layer and a hot melt adhesive layer. A manufacturing method of the laminate film may be conventional manufacturing methods of laminate films such as coextrusion, melt coating, extrusion lamination, dry lamination, etc.

Resins used for the other resin layers are not particularly limited and may be, for example, polyolefin resin such as polyethylene (low density, high density), ethylene-propylene copolymer, ethylene-butene copolymer, ethylene-hexene copolymer, ethylene-octene copolymer, polypropylene, ethylene-vinyl acetate copolymer, ethylene-methyl methacrylate copolymer and an ionomer resin; polyester resins such as polyethylene terephthalate, polybutylene terephthalate and polyethylene naphthalate; acrylic resins such as polymethyl methacrylate; styrene- and/or acrylonitrile-based resins such as polystyrene, styrene-acrylonitrile copolymer, styrene-acrylonitrile-butadiene copolymer and polyacrylonitrile; hydrophobicated cellulose resins such as cellulose triacetate and cellulose diacetate; hydrogen-bonding resins such as polyvinylalcohol, ethylene-vinylalcohol copolymer and cellulose derivatives; engineering plastic resins such as polycarbonate resin, polysulfone resin, polyethersulfone resin, polyether ether ketone resin, polyphenylene oxide resin, polymethylene oxide resin and liquid crystal polyester resin.

Especially as a substrate layer, a biaxially oriented polypropylene, polyethylene terephthalate or nylon, a biaxially oriented polypropylene coated with polyvinylidene chloride (so-called K-coat), polyethylene terephthalate, a variety of vapor-deposited films such as an aluminum-vapor-deposited film, an alumina-vapor-deposited film and a silica-vapor-deposited film, and liquid crystal polyester resin, aramid resin or the like are preferably employed. Among these, polyolefin is preferred from the viewpoint of strength, and polyethylene, polypropylene and resin compositions formed of these resins are especially preferred.

In the case of placing a hot melt adhesive layer in the shrinkable film of the present invention, there can be exemplified polyolefin resins such as polyethylene (low density, high density), ethylene-vinylalcohol copolymer, ethylene-propylene copolymer, ethylene-butene copolymer, ethylene-hexene copolymer, ethylene-4-methyl-1-pentene copolymer, ethylene-octene copolymer, polypropylene, ethylene-vinyl acetate copolymer, ethylene-methyl methacrylate copolymer, ethylene-methyl acrylate copolymer, ethylene-acrylic acid copolymer and an ionomer resin; polyacrylates such as an acrylonitrile-butadiene-styrene copolymer, an acrylonitrile-styrene copolymer and an acrylonitrile copolymer polymethyl methacrylate; and the like from the viewpoints of heat sealing strength and a problem of desorption of resin odor.

When the laminate film has insufficient adhesion between each layer, adhesive resin layers may be placed. The adhesive resin layer is not particularly limited unless it occurs delamination in actual use, and may be a layer formed of a modified olefin-based polymer having a carboxyl group obtained by chemically bonding an unsaturated carboxylic acid or an anhydride thereof to an olefin-based polymer by an addition reaction, a grafting reaction or the like. Concretely, preferred are one or mixtures of two or more selected from maleic anhydride-graft-modified polyethylene, maleic anhydride-graft-modified polypropylene, maleic anhydride-graft-modified ethylene-ethyl acrylate copolymer, maleic anhydride-graft-modified ethylene-vinyl acetate copolymer, ethylene-acrylic acid copolymer and ionomer resin.

Especially from the viewpoint of shrinkability, the shrinkable film of the present invention preferably has at least one layer containing an ionomer resin. Examples of the ionomer resin includes a polymer obtained by a polyolefin-based copolymer resin comprising a polyolefin resin and an unsaturated carboxylic acid partially crosslinked with a metal ion such as ionomer resin manufactured by Mitsui-DuPont Polychemical Co., Ltd. (trade name: Himilan 1601; MI=1.2; crosslinked with Na ion, melting point=96° C.), etc. Examples of the polyolefin resin contained in the ionomer resin include resins such as polyethylene, polypropylene, polypentene, polyhexene and polyheptene. Among these, polyethylene is especially favorably used. As the unsaturated carboxylic acid, acrylic acid, methacrylic acid, etc are preferably used. A more favorable ionomer resin may be a partially ionized product of ethylene/(meth)acrylic acid copolymer. Examples of the metal ion include ions of sodium, calcium, magnesium, zinc, etc.

Examples of methods for producing the shrinkable film of the present invention include a method comprising a step of stretching in at least uniaxial direction the aforementioned laminate film until its average shrinking rate in its longitudinal and transverse directions after immersion in a 120° C. oil bath for ten seconds becomes 45% or more. Preferably, one may stretch the laminate film until its average shrinking rate in its longitudinal and transverse directions after immersion in an 80° C. oil bath for ten seconds becomes 20% or more. Exemplary stretching method may be conventional stretching methods such as uniaxial stretching, zone stretching, flat sequential stretching, simultaneous biaxial stretching, tubular stretching, etc. From the viewpoint of equipmental cost, tubular stretching is preferred.

A thickness of the shrinkable film obtained is usually 10–500 $\mu$m. When the film is used for wrapping applications, the thickness thereof is usually 15–100$\mu$m. The oxygen transmission rate of the shrinkable film measured under a dry condition is preferably 30 cc/m$^2$·day·atm or less from the viewpoint of the gas barrier property. The thickness of the layer formed of the gas barrier resin composition is preferably 5% to 30% of the thickness of the shrinkable film from the viewpoints of the gas barrier property and economy. In the present invention, the phrase "dry condition" means, for example, the conditions of 23° C. and a relative humidity of 10% or less.

Additives conventionally incorporated to films such as fillers, antistatic agents, a variety of stabilizers, nucleating agents, colorants and lubricants, rubber components and so on may be incorporated to the shrinkable film of the present invention unless the effect of the present invention is damaged.

The shrinkable film of the present invention has good oxygen barrier property, processability, transparency and stretchability, and can be suitably used for wrapping food or the like.

EXAMPLES

The present invention is illustrated in detail by the following examples but is not limited thereto. Measuring methods of physical properties are as follows:

[Oxygen Transmission Rate]

Using a film obtained by tubular stretching as a test specimen, measurement of an oxygen transmission rate was carried out.

The oxygen transmission rate was determined by setting a sample film (test specimen) to a commercially available oxygen transmission rate measuring machine (trade name: OX-TRAN 10/50A, manufactured by MOCON Corp., USA). The oxygen transmission rate of the test specimen was continuously measured, and the value of the oxygen transmission rate at the time when the oxygen transmission rate had become substantially constant (usually, several hours to about three days after the beginning of the measurement) was adopted as data in this specification. The measurement was carried out at 23° C. and at a relative humidity (RH) of 0%. The oxygen transmission rate has a unit of cc/m$^2$·day·atm. As for the gas barrier resin composition (a), the oxygen transmission rate obtained above was converted into an oxygen transmission rate per a thickness of 1$\mu$m, and the value was defined as an OTR.

[Melting Point]

The melting point ($T_{im}$) was measured by using a differential scanning calorimeter in accordance with JIS K7121 after pretreating a sample which had been left in the measuring machine at 23° C. and at a relative humidity of 50% for 24 hours or more. The pretreatment was carried out by heating the sample in the measuring machine up to the temperature (hereinafter referred to as "the maximum temperature") which is 30° C. higher than the temperature at which the sample shows a melting peak, keeping the sample at the maximum temperature for 10 minutes, and cooling the sample at a rate of 10° C./minute down to the temperature which is 50° C. lower than the temperature at which a transitional peak appears.

The measurement of the melting point was carried out by heating the above-mentioned pretreated sample at a rate of 10° C./minute at least until a melting peak was observed. The temperature which corresponds to the intersection of the straight line formed by extending the base line on the lower temperature side of the melting peak in the DSC curve to the higher temperature side and the tangent line having the largest incline drawn to the curve on the lower temperature side of the melting peak is defined as $T_{im}$.

[Haze]

A film used for measuring a haze was obtained by conducting hot press at 200° C. for three minutes followed by performing cooling press at 30° C. for five minutes. A direct-reading haze computer (HGM-DP manufactured by Suga test instruments Co., Ltd.) was used in the measurement of the haze. The haze value measured in dimethyl phthalate is hereinafter represented by $T_3$.

The haze is defined by the expression: (scattered light transmission rate/total light transmission rate)×100 (%), and measured by the method of JIS K7105. The smaller the haze, the more the transparency.

[Shrinking Rate]

The shrinking rate was determined by the method provided in ASTM D2732. Using a piece obtained by cutting a film into a size of 100 mm×100 mm as a test specimen, a value of ((L1−L2)/L1×100) was calculated from a length (L1) of a side of the specimen before shrinking and a length (L2) of that side after pulling up the specimen after immersion in an oil bath set at a predetermined temperature for 10 seconds, and the value was defined as a shrinking rate (S1). The S1 has a unit of %. The shrinking rate was measured in the longitudinal direction and in the transverse direction of the test specimen, respectively.

Example 1

Dipentaerythritol (hereinafter referred to as DP) and ditrimethylolpropane (hereinafter referred to as DTMP) both manufactured by Koei Chemical Co., Ltd. were mixed in a weight ratio of 1/1. The DP had an sp of 18.7, an $mw_i$ of 272 and an $sp×mw_i^{1/2}$ value of 308. The DTMP had an sp of 14.4, an $mw_i$ of 250 and an $sp×mw_i^{1/2}$ value of 228. The mixture obtained had an average solubility parameter (SP) of 16.4, a weight average molecular weight (MW) of 261, an $SP×MW^{1/2}$ value of 265. This mixture was dry blended with a saponified ethylene/vinyl acetate copolymer having an ethylene content of 44 mol % and a saponification degree of 98% or more (EP-E105A manufactured by Kuraray Co., Ltd.; hereinafter referred to as EVOH-E) in a weight ratio of 10/90 wt %, and melt kneaded in a twin-screw extruder (the 40 mm φ extruder BT-40-S2-60-L manufactured by Research Laboratory of Plastics Technology Co., Ltd., L/D= 60) while removing water through a vent hole placed in the middle of the barrel to yield a gas barrier resin composition. An oxygen transmission rate, a melting point and hazes ($T_1$, $T_2$ and $T_3$) of the gas barrier resin composition obtained were measured. The measurement results are shown in Table 1.

Three-kind five-layer tubular stretching molding, which used the gas barrier resin composition for an intermediate layer, a linear low density polyethylene (density=0.91 g/cm³, MFR=2.0 (g/10 min), FZ201-0 manufactured by Sumitomo Chemical Co., Ltd.) for the outermost layers and a resin obtained by dry blending an ionomer (MI=1.2 (g/10 min), the metal ion-crosslinked ionomer of ethylene/methacrylic acid copolymer HIMILAN 1601 manufactured by Mitsui-DuPont Polychemical Co., Ltd.) and an adhesive resin (density=0.94, MFR=3 (g/10 min : 190° C., 2160 g), bondine TX8030 manufactured by Sumika Atchem Co., Ltd.) in a weight ratio of 1/1 for adhesive layers, was carried out to yield a sheet having a total thickness of 18.7μm and a thickness composition of 22.5/22.5/10/22.5/22.5 vol % (outermost layer/adhesive layer/intermediate layer/adhesive layer/outermost layer). The tubular stretching molding was carried out by using a tubular coextruder manufactured by Research Laboratory of Plastics Technology Co., Ltd. having an extruder with a screw diameter of 50 mm φ (for the outermost layers), an extruder with a screw diameter of 40 mm φ (for the adhesive layers), an extruder with a screw diameter of 32 mm φ (for the intermediate layer) and a circular die for three-kind five layer coextrusion with a diameter of 50 mm φ to yield an unstretched, tubularly coextruded laminate sheet. The unstretched laminate sheet had a thickness of 300 mm. The unstretched laminate sheet was sent out at a speed of 2 m/min to be subjected to simultaneous biaxial tubular stretching in an MD/TD ratio of 4/4. After the above operations, a stretched film with a thickness of 18μm was obtained. An oxygen transmission rate and a shrinking rate of the stretched film obtained were measured. The measurement results are shown in Table 1.

Example 2

An oxygen transmission rate, a melting point and hazes ($T_1$, $T_2$ and $T_3$) of a gas barrier resin composition obtained by dry blending a mixture of the DP and the DTMP in a weight ratio of 1/1 and the EVOH-E in a weight ratio of 30/70 wt % were measured. The measurement results are shown in Table 1. A stretched film was prepared in the same manner as Example 1 except for using the above gas barrier resin composition for an intermediate layer. An oxygen transmission rate and a shrinking rate of the stretched film obtained were measured. The measurement results are shown in Table 1.

Example 3

An oxygen transmission rate, a melting point and hazes ($T_1$, $T_2$ and $T_3$) of a gas barrier resin composition obtained by dry blending the DP and a saponified ethylene/vinyl acetate copolymer having an ethylene content of 32 mol % and a saponification degree of 98% or more (EP-F101B manufactured by Kuraray Co., Ltd.; hereinafter referred to as EVOH-F) in a weight ratio of 10/90 wt % were measured. The measurement results are shown in Table 1. A stretched film was prepared in the same manner as Example 1 except for using the above gas barrier resin composition for an intermediate layer. An oxygen transmission rate and a shrinking rate of the stretched film obtained were measured. The measurement results are shown in Table 1.

Example 4

An oxygen transmission rate, a melting point and hazes ($T_1$, $T_2$ and $T_3$) of a gas barrier resin composition obtained by dry blending a mixture of the DP and the DTMP in a weight ratio of 1/1 and the EVOH-E in a weight ratio of 10/90 wt % were measured. The measurement results are shown in Table 1. A stretched film was prepared in the same manner as Example 1 except for using the above gas barrier resin composition for an intermediate layer, an ionomer (MI=1.2 g/10 min; the metal ion-crosslinked ionomer of ethylene/methacrylic acid copolymer HIMILAN 1601 manufactured by Mitsui-DuPont Polychemical Co., Ltd.) for outermost layers and an acid modified polyethylene (density=0.89, MI=5.7 g/10 min; admer NF500 manufactured by Mitsui Petrochemical Industries, Ltd.) for adhesive layers and making the thickness composition 40/5/10/5/40 vol. % (outermost layer/adhesive layer/intermediate layer/adhesive layer/outermost layer). An oxygen transmission rate and a shrinking rate of the stretched film obtained were measured. The measurement results are shown in Table 1.

Example 5

An oxygen transmission rate, a melting point and hazes ($T_1$, $T_2$ and $T_3$) of a gas barrier resin composition obtained by dry blending a mixture of the DP and the DTMP in a weight ratio of 1/1 and the EVOH-E in a weight ratio of 30/70 wt % were measured. The measurement results are shown in Table 1. A stretched film was prepared in the same manner as Example 4 except for using the above gas barrier resin composition for an intermediate layer. An oxygen transmission rate and a shrinking rate of the stretched film obtained were measured. The measurement results are shown in Table 1.

Example 6

An oxygen transmission rate, a melting point and hazes ($T_1$, $T_2$ and $T_3$) of a gas barrier resin composition obtained by dry blending the DP and the EVOH-F in a weight ratio of 10/90 wt % were measured. The measurement results are shown in Table 1. A stretched film was prepared in the same manner as Example 5 except for using the above gas barrier resin composition for an intermediate layer and making the thickness composition 40/5/10/5/40 vol. % (outermost layer/adhesive layer/intermediate layer/adhesive layer/outermost layer). An oxygen transmission rate and a shrinking rate of the stretched film obtained were measured. The measurement results are shown in Table 1.

Comparative Example 1

A stretched film was prepared in the same manner as Example 1 except for using a linear low density polyethylene (density=0.91 g/cm$^3$, MFR=2.0 (g/10 min), FZ201-0 manufactured by Sumitomo Chemical Co., Ltd.) for outermost layers, an adhesive resin (density=0.92 g/cm$^3$, MI=1.8 (g/10 min), admer NF500 manufactured by Mitsui Petrochemical Industries, Ltd.) for adhesive layers and a saponified ethylene/vinyl ester copolymer (EP-E105A manufactured by Kuraray Co., Ltd.) for an intermediate layer. An oxygen transmission rate and a shrinking rate of the stretched film obtained we re measured. The measurement results are shown in Table 1.

Comparative Example 2

With the EVOH-E being kneaded in the twin-screw extruder (the 40 mm φ extruder BT-40-S2-60-L manufactured by Research Laboratory of Plastics Technology Co., Ltd., L/D=60), a polyaminoamide (Tohmide #235-A: hereinafter referred to as PAA) obtained by condensation polymerization of a polymerized soybean oil fatty acid, which is an aliphatic dicarboxylic acid, and triethylenetetramine, which is an alkylenepolyamine, was charged to the barrel of the extruder using a pump for supplying liquids so that a ratio of EVOH-E/PAA became 90/10 wt %. Kneading was carried out while water being removed through a vent hole placed in the middle of the barrel to yield a resin composition. The PAA had a viscosity of 8000–18000 mPa·s at 25° C. and an amine value determined in accordance with JIS K7237 of 390±15. An oxygen transmission rate, a melting point and hazes ($T_1$, $T_2$ and $T_3$) of the resin composition were measured. The measurement results are shown in Table 1.

A stretched film was prepared in the same manner as Example except for using the above resin composition for an intermediate layer, a FZ201-0 manufactured by Sumitomo Chemical Co., Ltd.) for outermost layers and an adhesive resin (density=0.92 g/cm$^3$, MI=1.8 g/10 min, admer NF500 manufactured by Mitsui Petrochemical Industries, Ltd.) for adhesive layers. An oxygen transmission rate and a shrinking rate of the stretched film obtained were measured. The measurement results are shown in Table 1.

As is clear from Table 1, the shrinkable film of the present invention had good oxygen barrier property, processability, transparency and stretchability.

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| Intermediate layer | Name of resin | EVOH-E | EVOH-E | EVOH-F | EVOH-E | EVOH-E | EVOH-F | EVOH-E | EVOH-E |
|  | Ethylene content mol % | 44 | 44 | 32 | 44 | 44 | 32 | 44 | 44 |
| Gas barrier resin composition | Mixing ratio wt % | 90 | 70 | 90 | 90 | 70 | 90 | 100 | 100 |
|  | Name | DTMP | DTMP | DTMP | DTMP | DTMP | DTMP | — | PAA |
|  | Mixing ratio wt % | 5 | 15 | 0 | 5 | 15 | 0 | — | 10 |
|  | Name | DP | DP | DP | DP | DP | DP | — | — |
|  | Mixing ratio wt % | 5 | 15 | 10 | 5 | 15 | 10 | 0 | 0 |
|  | SP | 16.4 | 16.4 | 18.7 | 16.4 | 16.4 | 18.7 | — | (13.8) |
|  | MW | 261 | 261 | 272 | 261 | 261 | 272 | — | (374<) |
|  | SP × MW$^{1/2}$ | 265 | 265 | 308 | 265 | 265 | 308 | — | — |
|  | OTR | 17 | 15 | 6 | 17 | 15 | 6 | 23 | 113 |
|  | Tim ° C. | 147 | 138 | 159 | 147 | 138 | 159 | 157 | 157 |
|  | C* (=expression (1)) | −1.0 | −1.7 | −1.2 | −1.0 | −1.7 | −1.2 | 0.0 | 1.6 |
|  | $T_1$ | 2.6 | 2.4 | 4.1 | 2.6 | 2.4 | 4.1 | 5.0 | 5.5 |
|  | $T_2$ | 2.6 | 21.0 | 4.1 | 2.6 | 21.0 | 4.1 | 5.0 | 7.0 |
|  | $T_2$–$T_1$ (=expression (2)) | 0.0 | 18.6 | 0.0 | 0.0 | 18.6 | 0.0 | 0.0 | 1.5 |

TABLE 1-continued

| | | | | | | | | | |
|---|---|---|---|---|---|---|---|---|---|
| | $T_3$ | 0.3 | 0.4 | 1.5 | 0.3 | 0.4 | 1.5 | 1.0 | 1.2 |
| | Ratio of layer thickness vol. % | 10 | 10 | 10 | 10 | 10 | 10 | 10 | 10 |
| Outer layer | Ratio of layer thickness vol. % | LLDPE 45 | | | Ionomer 80 | | | LLDPE 45 | |
| Adhesive layer | Ratio of layer thickness vol. % | Ionomer + Adhesive resin 45 | | | Adhesive resin 10 | | | Adhesive resin 45 | |
| Physical properties of laminate article | Tubular stretching temperature (° C.) | 88 | 85 | 90 | 69 | 69 | 80 | 92 | 90 |
| | Shrinking rate 80° C. MD %/TD % | 21/28 | 25/28 | 21/20 | 18/22 | 28/26 | 28/19 | 18/18 | 35/31 |
| | Shrinking rate 120° C. MD %/TD % | 47/49 | 52/60 | 45/47 | 75/62 | 75/64 | 61/50 | 40/41 | 55/56 |
| | Oxygen transmission rate at 23 ° C./0% RH cc/m² · day · atm | 20 | 18 | 3 | 21 | 19 | 5 | 32 | 163 |

*The value of $\ln(OTR/22.5) + 0.0698(T_{im} - 157)$ is represented by C.

What is claimed is:

1. A shrinkable film characterized by being a laminate film having at least one layer formed of a gas barrier resin composition satisfying the following expressions (1) and (2) and by having an average shrinking rate in its longitudinal and transverse directions after immersion in a 120° C. oil bath for ten seconds of 45% or more, and at least one other layer:

$$\ln(OTR/22.5) + 0.0698(T_{im} - 157) < -0.06 \quad (1),$$

and $$T_2 - T_1 \leq 20 \quad (2),$$

wherein the expression (1), OTR and $T_{im}$ are, respectively, an oxygen transmission rate (cc/m2·day·atm) of a 1.0 μm thick portion of a film formed of the gas barrier resin composition at 23° C. and a relative humidity of 0% and a melting point of the gas barrier resin composition, and in the expression (2) $T_1$ is a haze (%) of a 30.0 μm thick film of the gas barrier resin composition left at 23° C. and a relative humidity of 48% for 48 hours and $T_2$ is a haze (%) of a 30.0 μm thick film of the gas barrier resin composition left at 40° C. and a relative humidity of 90% for 24 hours.

2. The shrinkable film according to claim 1 wherein its average heat shrinking rate in the longitudinal and transverse directions after immersion in an 80° C. oil bath for 10 seconds is 20% or more.

3. The film according to claim 1 wherein its oxygen transmission rate at a dry condition is 30 cc/m²·day·atm or less.

4. The film according to claim 1 wherein a gas barrier resin composition, a 30 μm film formed thereof having a haze value measured after immersion in dimethyl phthalate of 15% or less, is used.

5. The film according to claim 1 wherein the gas barrier resin composition is a saponified ethylene-vinyl ester copolymer-containing resin composition.

6. The film according to claim 5 wherein the saponified ethylene-vinyl ester copolymer-containing resin composition contains 99–50 wt % of a saponified ethylene-vinyl ester copolymer.

7. The film according to claim 5, wherein the saponified ethylene-vinyl ester copolymer-containing resin composition is a resin composition comprising the saponified ethylene-vinyl ester copolymer and one or two or more species of alcohol compounds represented by the general formula (1):

where $R_1$ to $R_6$ are same or different and are a hydrogen atom or atomic groups formed of at least two atoms selected from the group consisting of, carbon, hydrogen, oxygen, nitrogen, sulfur and phosphorous and the total atomic weights of the atoms forming $R_2$ is equal to or more than the total atomic weight of the atoms forming $R_1$, and wherein the alcohol compound has a solubility parameter (SP) calculated from the FEDORS' formula of 12 or more and an SP×MW$^{1/2}$ value of 225 or more where MW indicates the molecular weight of the alcohol compound, with the proviso that when two or more species of the alcohol compounds are contained, SP and MW are an average solubility parameter and a weight average molecular weight, respectively.

8. The film according to claim 7 wherein the alcohol compound represented by the general formula (1) has an SP of 13 or more.

9. The film according to claim 7 wherein the alcohol compound represented by the general formula (1) has an SP×MW$^{1/2}$ value of 235 or more and 20000 or less.

10. The film according to claim 7 wherein the substituent $R_1$ of the alcohol compound represented by the general formula (1) is an hydrogen atom, a hydroxyalkyl group, an alkyl group, an amino group or an atomic group having an amino group.

11. The film according to claim 7 wherein the substituent $R_1$ of the alcohol compound represented by the general formula (1) is a hydroxymethyl group, a methyl group or an ethyl group.

12. The film according to claim 7 wherein the substituent $R_2$ of the alcohol compound represented by the general formula (1) is an atomic group having an OH group and the total atomic weight of the atoms forming $R_2$ is 31 or more.

13. The film according to claim 7 wherein the substituent $R_2$ of the alcohol compound represented by the general formula (1) is an atomic group having an OH group and the total atomic weight of the atoms forming $R_2$ is 31 or more and said $R_2$ has an ether bond.

14. The film according to claim 7 wherein the substituents $R_3$ to $R_6$ of the alcohol compound represented by the general formula (1) are same or different and are a hydrogen atom or an alkyl group having 1 to 6 carbon atoms.

15. The film according to claim 7 wherein the substituents $R_3$ to $R_6$ of the alcohol compound represented by the general formula (1) are same or different and are a methyl group or an ethyl group.

16. The film according to claim 7 wherein the saponified ethylene-vinyl ester copolymer-containing resin composition is a resin composition comprising the saponified ethylene-vinyl ester copolymer and two or more sorts of the alcohol compounds represented by the general formula (1) and wherein at least one sort of the alcohol compounds has a solubility parameter (sp) calculated from the FEDORS' formula of 16 or more and an $sp \times mw_i^{1/2}$ value of 280 or more where $mw_i$ indicates a molecular weight of the alcohol compound.

17. The film according to claim 16 wherein at least one sort of the alcohol compounds represented by the general formula (1) is di-pentaerythritol.

18. The film according to claim 7 wherein the alcohol compound represented by the general formula (1) is polytrimethylolpropane or di-pentaerythritol.

19. The film according to claim 7 wherein the alcohol compound represented by the general formula (1) is a dimer, a trimer, a tetramer or a pentamer of trimethylolpropane.

20. The film according to claim 1 wherein the film has at least one layer containing an ionomer resin besides the layer formed of the gas barrier resin composition.

21. The film according to claim 20 wherein the ionomer resin is a partially ionized ethylene-(meth)acrylic acid copolymer.

22. A method for producing shrinkable film, which is characterized by comprising a step of stretching in at least uniaxial direction a laminate film having at least one layer formed of a gas barrier resin composition satisfying the following expressions (1) and (2) until its average shrinking rate in its longitudinal and transverse directions after immersion in a 120° C. oil bath for ten seconds becomes 45% or more, and at least one other layer:

$$\ln(OTR/22.5)+0.0698(T_{im}-157)<-0.06 \quad (1),$$

and $$T_2-T_1 \leq 20 \quad (2),$$

wherein the expression (1), OTR and $T_{im}$ are, respectively, an oxygen transmission rate (cc/m2·day·atm) of a 1.0 μm thick portion of a film formed of the gas barrier resin composition at 23° C. and a relative humidity of 0% and a melting point of the gas barrier resin composition, and in the expression (2) $T_1$ is a haze (%) of a 30.0 μm thick film of the gas barrier resin composition left at 23° C. and a relative humidity of 48% for 48 hours and $T_2$ is a haze (%) of a 30.0 μm thick film of the gas barrier resin composition left at 40° C. and a relative humidity of 90% for 24 hours.

23. The method according to claim 22 wherein stretching in at least uniaxial direction is carried out by a tubular stretching method.

* * * * *